(12) United States Patent
Cope et al.

(10) Patent No.: US 7,728,463 B2
(45) Date of Patent: Jun. 1, 2010

(54) RELUCTANCE LAMINATIONS FOR A MOTOR ASSEMBLY

(75) Inventors: David Cope, Medfield, MA (US); Andrew M. Wright, Cambridge, MA (US); Christopher J. Corcoran, Newton, MA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/029,978

(22) Filed: Feb. 12, 2008

(65) Prior Publication Data
US 2008/0191577 A1     Aug. 14, 2008

Related U.S. Application Data

(60) Provisional application No. 60/889,417, filed on Feb. 12, 2007.

(51) Int. Cl.
*H02K 41/02* (2006.01)
*H02K 41/00* (2006.01)

(52) U.S. Cl. .................................... 310/12.14; 310/13
(58) Field of Classification Search .............. 310/12.14, 310/13
See application file for complete search history.

(56) References Cited

U.S. PATENT DOCUMENTS 6,909,205 B2 * 6/2005 Corcoran et al. .............. 310/12

OTHER PUBLICATIONS

Miller, TJE, "Switched Reluctance Motor Design", Switched Reluctance Motors and Their Control, 1993, pp. 25-52, Magna Physics Publishing and Clarendon Press, Oxford.
Engelmann, Chapter 7, "Rotational Systems", Static and Rotating Electromagnetic Devices, Mar. 31, 1982, pp. 181-191, Marcel Dekker, Inc., New York and Basel.
Woodson, et al., 4.2.3 "Discussion of Saliency in Different Machine Types", Electromechanical Dynamics, Part I: Discrete Systems, Jan. 1, 1968, John Wiley & Sons, New York.
Say, M.G., "Alternating Current Machines", Chapter 13, Special Machines, 1983, pp. 533, and 540-542, Wiley & Sons, New York.
Chapman, Stephen J., "Electric Machinery Fundamentals", Chapter 11, Single-Phase and Special-Purpose Motors, 1985, pp. 631, 661-663, McGraw-Hill, New York.

* cited by examiner

*Primary Examiner*—Quyen Leung
*Assistant Examiner*—Jose A Gonzalez Quinones
(74) *Attorney, Agent, or Firm*—Hayes Soloway P.C.

(57) ABSTRACT

A system and method for a multiple degrees of freedom motor includes an output shaft. A stator is provided having at least a first lamination stack. Each lamination stack has an interior curved surface. The lamination stacks are disposed adjacent the output shaft. A rotor is fixed to the output shaft and movably supported adjacent the stator with an air gap disposed between the rotor and the stator. The rotor includes at least one magnet disposed thereon. The magnet is movable along the interior curved surface of the lamination stacks in directions defining at least a first degree of freedom. The rotor is biased toward a base position along at least one degree of freedom.

19 Claims, 4 Drawing Sheets

RELUCTANCE LAMINATIONS FOR A MOTOR ASSEMBLY

CROSS-REFERENCE TO RELATED APPLICATION

This application claims priority to copending U.S. Provisional Application entitled, "Reluctance Laminations for a Motor Assembly" having Ser. No. 60/889,417, filed Feb. 12, 2007 which is entirely incorporated herein by reference.

FIELD OF THE INVENTION

The present invention relates, generally, to a motor assembly that provides an output in one or more degrees of freedom for use in joystick and other applications, and more particularly, to an improved force feedback joystick.

BACKGROUND OF THE INVENTION

Various force feedback motor designs providing multiple degrees of freedom are known in the art for use in a wide variety of applications. For example, multiple degrees of freedom in motor output are particularly useful in linear actuation and positioning applications. Another application in which such motors may be used is in joystick applications for real control of an associated apparatus, e.g., direct control of an aircraft, wheelchair, or other vehicle, or for simulation apparatus control, e.g. video games, flight simulation, virtual reality simulation, etc. In these applications a control system may be provided for sensing a user's manipulation of a joystick, i.e., the motor output shaft, and providing a signal for controlling the application.

Many applications also require force or tactile ("haptic") feedback to the user. The need for the user to obtain realistic tactile information and experience tactile sensation is extensive in many kinds of simulation and other applications. For example, in medical/surgical simulations, the "feel" of a probe or scalpel simulator is important as the probe is moved within the simulated body. It would be invaluable to a medical trainee to learn how an instrument moves within a body, how much force is required depending on the operation performed, the space available in a body to manipulate an instrument, etc. In simulations of vehicles or equipment, force feedback for controls such as a joystick can be necessary to realistically teach a user the force required to move the joystick when steering in specific situations, such as in a high acceleration environment of an aircraft. Alternatively, when actually operating in a high acceleration vehicle environment, the force feedback can be used to counteract the effect of the acceleration induced forces on the hand and thus improve controllability and safety of the vehicle. In virtual world simulations where the user can manipulate objects, force feedback is necessary to realistically simulate physical objects; for example, if a user touches a pen to a table, the user should feel the impact of the pen on the table. An effective human-computer interface, such as a joystick, not only acts as an input device for tracking motion, but also as an output device for producing realistic tactile sensations. An interface that accurately responds to signals having fast changes and a broad range of frequencies as well as providing such signals accurately to a control system, is therefore desirable in these and other applications.

In addition, there is a desire to provide force feedback to users of computer systems in the entertainment industry. Joysticks and other interface devices can be used to provide force feedback to a user playing a video game or experiencing a simulation for entertainment purposes. Through such an interface device, a computer system can convey to the user the physical sensation of colliding into a wall, moving through a liquid, driving over a bumpy road, and other sensations. The user can thus experience an entire sensory dimension in the gaming experience that was previously absent. Force feedback interfaces can provide a whole new modality for human-computer interaction.

In typical multiple degrees of freedom apparatuses that are capable of providing force feedback, there are several disadvantages. Generally conventional devices are cumbersome and complex mechanisms that are difficult and expensive to manufacture. In particular, the use of a transmission between the actuator motor and the joystick reduces the performance of the device and reduces the reliability and life of the device. Many transmission types can fail in a manner that renders the device unusable. For industrial and military applications, reliability and maintenance concerns are sometimes linked to the safety of personnel. If a force feedback device is not reliable or failsafe, then its use in these applications may be restricted or prevented even though the force feedback capability would enhance the performance and safety for that application.

In consumer markets, low-cost is highly desirable. For example, personal computers for the home consumer are becoming powerful and fast enough to provide force feedback to the typical mass-market consumer. A need is thus arising to be able to manufacture and market force feedback interfaces as cheaply and as efficiently as possible. The cost, complexity, reliability, and size of a force feedback interface for home use should be practical enough to mass-produce the devices. In addition, aesthetic concerns such as compactness and operating noise level of a force feedback device are of concern in the home market. Since the prior art feedback interfaces are mainly addressed to specific applications in industry, most force feedback mechanisms are costly, large, heavy, are easily broken, have significant power requirements, and are difficult to program for applications. The prior art devices require high-speed control signals from a controlling computer for stability, which usually requires more expensive and complex electronics. In addition, the prior art devices are typically large and noisy. These factors provide many obstacles to the would-be manufacturer of force feedback interfaces to the home computer market.

Moreover, DC (direct current) motors, which are commonly used in prior art devices, suffer from several disadvantages that make them unsuitable for many applications. For example, DC motors do not have inherent positional control and require additional sensors (e.g., optical) to determine the position of the rotor. Such sensors may malfunction because of dust or wear particles created by the mechanical braking system. This can have a negative effect on achieving the accuracy and precision of movement required in certain applications. DC motors also lack braking control and must incorporate additional mechanisms, such as gearing, clutches, and a solenoid brake to control speed and/or stop the rotor in desired positions. These additional components increase the mechanical complexity of the system and are susceptible to wear and tear. Thus, the reliability of a DC motor system is frequently an issue.

It may be desirable in some motor assemblies allowing output in multiple degrees of freedom to bias or otherwise force the joystick to return to a base position when external forces are not acting upon it. For instance, similar to the manner in which a steering wheel in an automobile can be expected to return to a position consistent with the front wheels facing straight when the steering wheel is released, it may be useful to have a flight simulating joystick return to a base position.

Thus, a heretofore unaddressed need exists in the industry to address the aforementioned deficiencies and inadequacies.

SUMMARY OF THE INVENTION

Embodiments of the present invention provide a system and method for providing a multiple degrees of freedom motor. Briefly described, in architecture, one embodiment of the system, among others, can be implemented as follows. The system contains a multiple degrees of freedom motor including an output shaft. A stator is provided having at least a first lamination stack. Each lamination stack has a curved interior curved surface. The lamination stacks are disposed adjacent the output shaft. A rotor is fixed to the output shaft and movably supported adjacent the stator with an air gap disposed between the rotor and the stator. The rotor includes at least one magnet disposed thereon. The magnet is movable along the interior curved surface of the lamination stacks in directions defining at least a first degree of freedom. The rotor is biased toward a base position along at least one degree of freedom.

The present invention can also be viewed as providing methods for providing a multiple degrees of freedom motor. In this regard, one embodiment of such a method, among others, can be broadly summarized by the following steps: disposing at least a first lamination stack adjacent said output shaft; fixing a rotor to said output shaft, said rotor being movably supported adjacent said lamination stacks with an air gap disposed between said rotor and said lamination stacks, said rotor including at least one magnet disposed thereon and being movable in directions defining at least a first degree of freedom; and biasing the output shaft to a base position along at least one degree of freedom.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

U.S. Pat. Nos. 6,909,205; 6,320,284; and 6,664,666 and U.S. patent application Ser. No. 10/635,318, all owned by Engineering Matters Inc., address motor assemblies allowing output in multiple degrees of freedom. These patents contain disclosures in varying levels of degree of the use of laminations in magnetic elements of direct drive controllers. The disclosures of these patents are incorporated herein by reference.

Non-spherical laminations may be intentionally included in a motor assembly system for the purpose of introducing tailored reluctance torques, which can provide power-OFF return to center torques. The torque, as a function of an angle, can be tailored to be linear. The torque tailoring can be made simultaneously in two degrees of freedom and can be made different for each degree of freedom.

Figure 1:
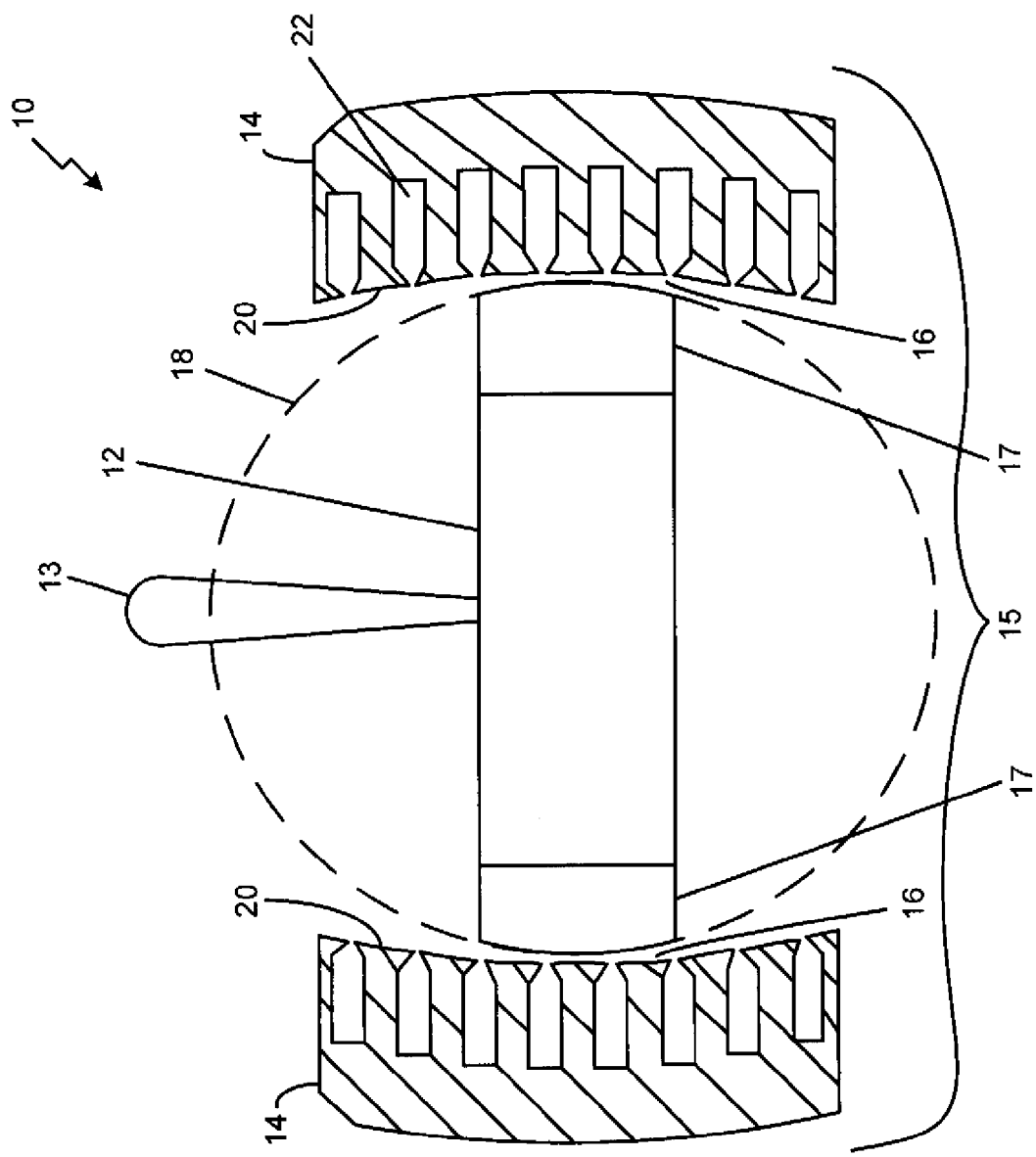
FIG. 1 is a front view of a portion of a motor assembly, in accordance with a first exemplary embodiment of the present invention.

FIG. 1 is a front view of a portion of a motor assembly 10, in accordance with a first exemplary embodiment of the present invention. The motor assembly 10 includes an output shaft 13 having a rotor 12. A stator 15 is provided having at least a first lamination stack 14. Two lamination stacks 14 are provided in the first exemplary embodiment, although these lamination stacks 14 are complementary (contributing to movement in only a single degree of freedom). One lamination stack 14 is located adjacent on each side of the rotor 12, although the present invention may be operable with only a single lamination stack 14. Each lamination stack 14 has an interior curved surface 20. The rotor 12 is movably supported adjacent the stator 14. The rotor 12 includes at least one magnet 17. The magnet 17 is movable along the interior curved surface 20 of the lamination stacks 14 in directions defining at least a first degree of freedom. An air gap 16 separates the rotor 12 and the lamination stacks 14 at all times regardless of the rotation of the rotor 12. The rotor 12 is biased toward a base position along at least one degree of freedom, the first degree of freedom in the first exemplary embodiment. The base position is the position to which the rotor 12 tends to return due to reluctance torques.

The interior curved surface 20 may be uniformly curved. The curve of the interior curved surface 20 may be spherically curved or cylindrically curved. The curvature of the interior curved surface 20 may impact the number of degrees of freedom available to the motor assembly 10. The motor assembly 10 may be operable without any slots 22 formed in the lamination stacks 14. While the device described herein is described with regards to a motor assembly 10, the invention may lend itself to other applications to which a stator 15 and base position biased rotor 12 are useful.

FIG. 1 also shows a periphery of rotation 18 for the rotor 12. It should be noted that the radius of the periphery of rotation 18 is shorter than the radius for the interior curved surface 20 of the lamination stacks 14. The arcuate shape of the interior curved surface 20 of the lamination stacks 14 makes the return torque of the rotor 12 nearly linear in rotation angle. The interior curved surface 20 of the lamination stacks 14 is designed and controlled to cause the reluctance forces of a specified nature to result. In particular, the rotor 12 can be made to return to base position in a spring-like manner, even in a power-OFF condition. This design may be desirable for fault-tolerant applications such as aircraft fly-by-wire and aircraft flight simulations.

The interior curved surface 20 may have a plurality of slots 22 formed therein. The slots 22 may lie in planes substantially parallel to one another. If the plurality of slots 22 is provided, the slots 22 may receive at least one stator coil (not shown). Energizing the stator coil (not shown) may cause the output shaft 13 to move along a first plane in the first degree of freedom. In this design, rotor 12 may return to the base position once the stator coil (not shown) is de-energized. More precisely, a biasing force will be present when the coil (not shown) is energized, but may be overcome by the force generated by energizing the stator coil (not shown).

The lamination stacks 14 are shown with the interior curved surface 20 having a radius materially greater than the radius of the periphery of rotation 18 for the rotor 12. More specifically, the radius of the interior curved surface 20 may range from the radius of the periphery of rotation 18 for the rotor 12 to a significantly higher, yet undetermined upper limit. Testing has shown the interior curved surface 20 having a radius at least twice as great as the radius of the periphery of rotation 18 for the rotor 12 has been effective for biasing the rotor 12 to a base position. Testing has shown the interior curved surface 20 having a radius three times greater than the radius of the periphery of rotation 18 for the rotor 12 has been effective for biasing the rotor 12 to a base position. The radius of the interior curved surface 20 may be uneven (non-uniformly curved), in which case a local radius of the interior curved surface 20 may be greater than the radius of the periphery of rotation 18 for the rotor 12 to provide a biasing force. The local radius of the interior curved surface 20 may be at least twice as great as the radius of the periphery of rotation 18 for the rotor 12 has been effective for biasing the rotor 12 to a base position.

Differences between the radius of the interior curved surface 20 and the radius of the periphery of rotation 18 for the rotor 12 may cause the air gap 16 disposed there between to be variant along said interior curved surface 20. More specifically, the air gap 16 may be smaller when the rotor 12 is closer to the base position and greater when the rotor 12 is further from the base position. The active element in the rotor 12 is the magnet 17. Thus, the air gap 16 between the magnet 17 and the lamination stack 14 may be smaller when the rotor 12 is closer to the base position and greater when the rotor 12 is further from the base position. Further, while the rotor 12 is shown having a disk shape in the first exemplary embodiment, the rotor 12 may be spherical, semi-spherical, cylindrical, or any other shape desirable by those having skill in the art and still be operable within the scope of the present invention. FIG. 1 shows the base position is achieved when the rotor 12 is in a horizontal position, although the rotor 12 and/or the lamination stacks 14 may be oriented to make any available position of the rotor 12 a base position as may be desired.

Figure 2:
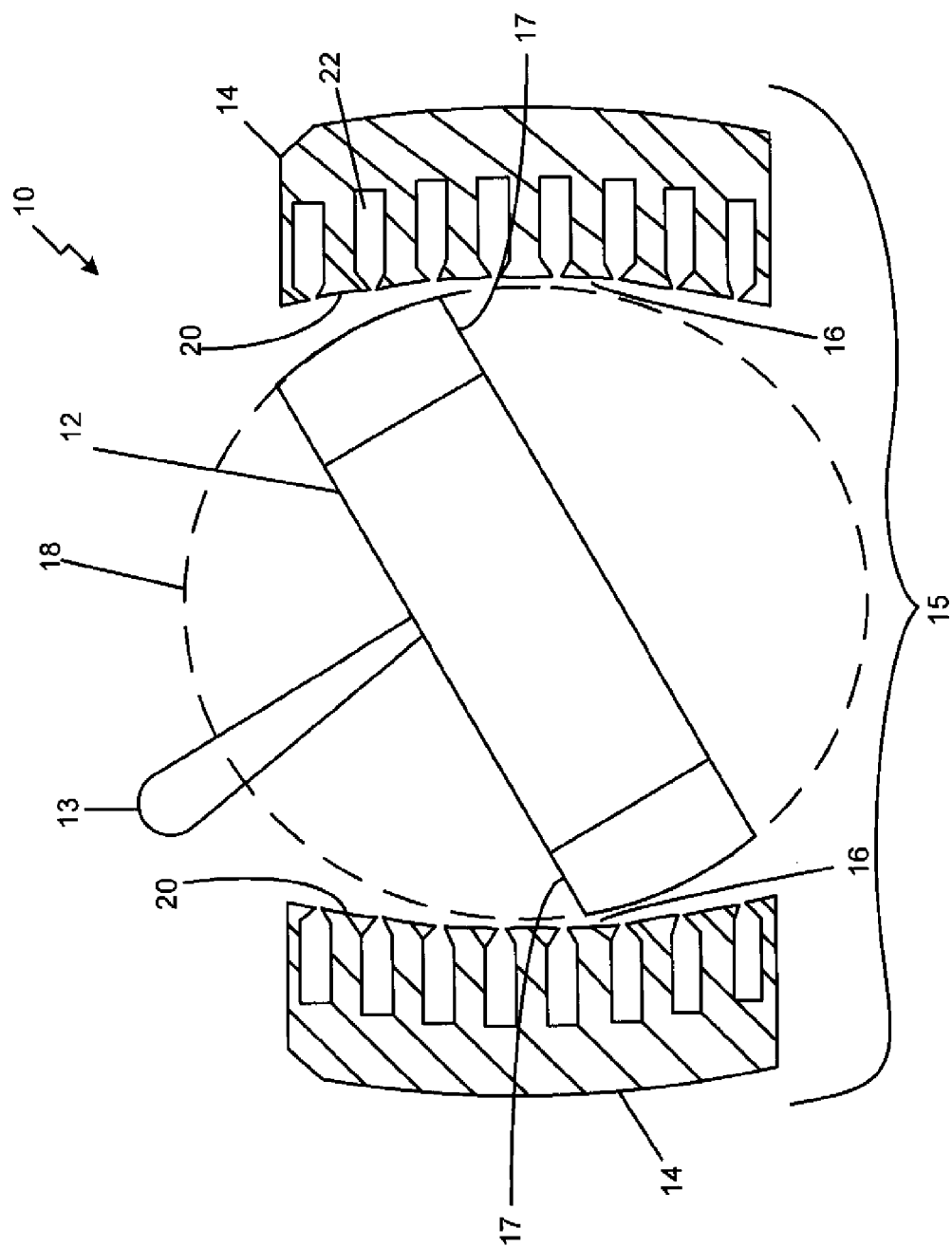
FIG. 2 is another front view of the portion of the motor assembly of FIG. 1, in accordance with the first exemplary embodiment of the present invention.

FIG. 2 is another front view of the portion of the motor assembly 10 of FIG. 1, in accordance with the first exemplary embodiment of the present invention. The rotor 12 is shown in a second position between the lamination stacks 14. Energization of the stator coil (not shown) of the lamination stacks 14 establishes a first magnetic field to urge the output shaft 13 to rotate in a first plane, defining the first degree of freedom. The first degree of freedom is substantially perpendicular to a longitudinal axis of wires of one of said stator coils (not shown) associated with the first degree of freedom. It will be noted that as the rotor 12 rotates away from the base position, the air gap 16 increases on each side of the rotor 12. The restoring torque is proportional to the rotated angle.

Figure 3:
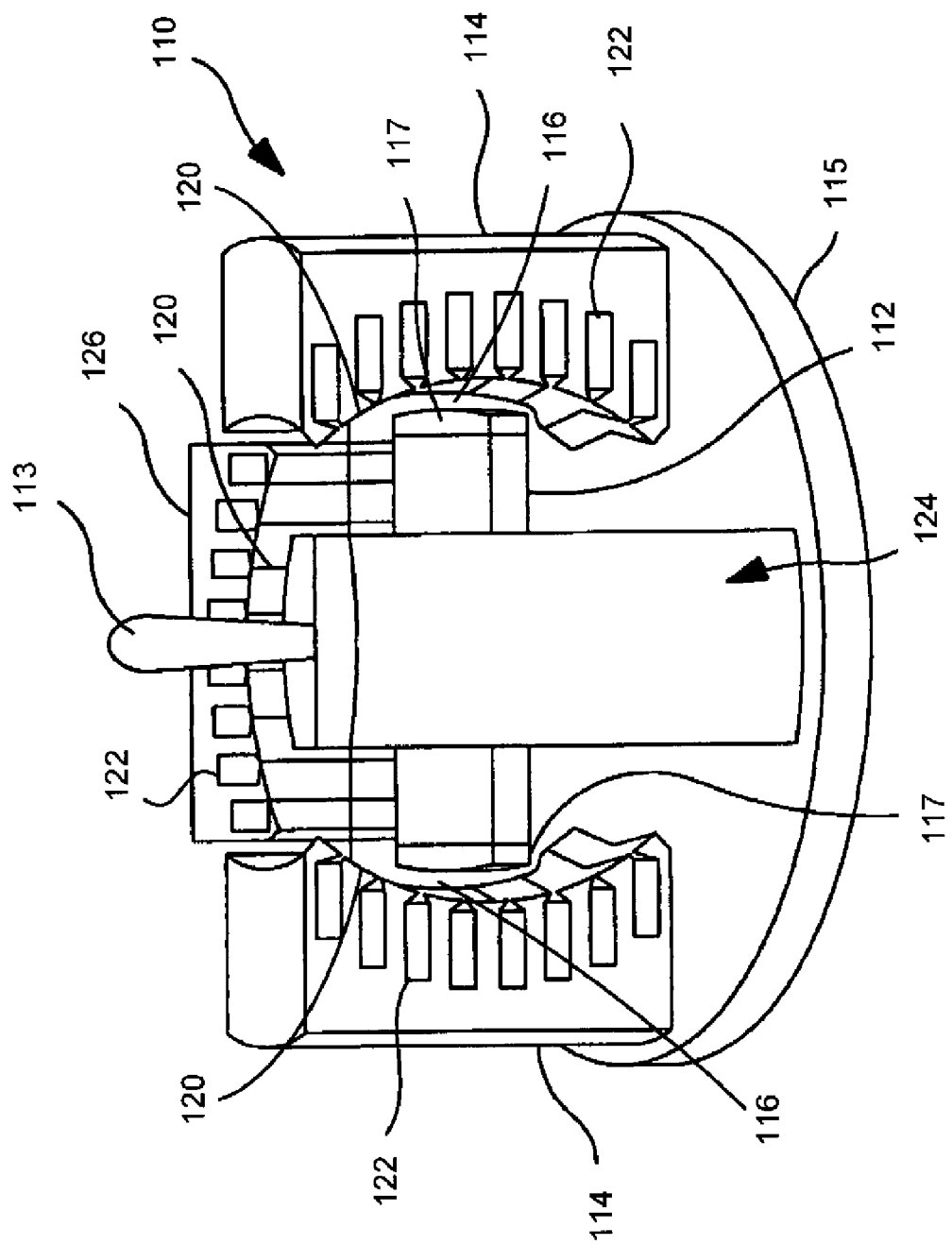
FIG. 3 is a perspective view of a portion of a motor assembly, in accordance with a second exemplary embodiment of the present invention.

FIG. 3 is a perspective view of a portion of a motor assembly 110, in accordance with a second exemplary embodiment of the present invention. The motor assembly 110 includes an output shaft 113 having a rotor 112. A stator 115 is provided having at least a first lamination stack 114. Two first lamination stacks 114 are provided in the second exemplary embodiment, although these lamination stacks 114 are complementary (contributing to movement in only a single degree of freedom). The first lamination stacks 114 have an interior curved surface 120 and a stator coil (not shown) wound thereon. A second lamination stack 124 has an interior curved surface 120 and a stator coil (not shown) wound thereon. A third lamination stack 126 has an interior curved surface 120 and a stator coil (not shown) wound thereon.

The first lamination stacks 114, the second lamination stack 124, and the third lamination stack 126 are located adjacent on each side of the rotor 112, although the present invention may be operable with only a single first lamination stack 114. The rotor 112 is movably supported adjacent the stator 115. The rotor 112 includes at least one magnet 117. The magnet 117 is movable along the interior curved surface 120 of the lamination stacks 114, 124, 126 in directions defining multiple degrees of freedom. The lamination stacks 114, 124, 126 may have a plurality of parallel slots 122, parallel within the lamination stacks 114, 124, 126, but not necessarily between the lamination stacks 114, 124, 126.

Energization of a first stator coil (not shown) mounted to the first lamination stacks 114 establishes a magnetic field to urge the output shaft 113 to rotate in a first plane. Energization of the second stator coil (not shown) mounted to the second lamination stack 124 establishes a second magnetic field to urge said output shaft 113 to rotate in a second plane substantially orthogonal to said first plane. Energization of the third stator coil (not shown) mounted to the third lamination stack 126 establishes a third magnetic field to urge said output shaft 113 to rotate in a third plane substantially orthogonal to each of said first and second planes.

An air gap 116 separates the rotor 112 and the lamination stacks 114, 124, 126 at all times regardless of the rotation of the rotor 112. The rotor 112 is biased toward a base position along at least one degree of freedom. The base position is the position to which the rotor 112 tends to return due to reluctance torques.

It should be noted that the radius of the periphery of rotation 118 of the rotor 112 may be shorter than the radius for the interior curved surface 120 for at least one of the lamination stacks 114, 124, 126. The arcuate shape of the interior curved surface 120 of the lamination stacks 114, 124, 126 makes the return torque of the rotor 112 nearly linear in rotation angle. The interior curved surface 120 of the lamination stacks 114, 124, 126 is designed and controlled to cause the reluctance forces of a specified nature to result. In particular, the rotor 112 can be made to return to base position in a spring-like manner, even in a power-off condition. More specifically, this design may return the rotor 112 to the base position once the stator coil (not shown) is de-energized. This design may be desirable for fault-tolerant applications such as aircraft fly-by-wire and aircraft flight simulations.

FIG. 3 does not clearly illustrate a relationship between the radii of the interior curved surface 120 of the lamination stacks 114, 124, 126 and the radius of the periphery of rotation 118 of the rotor 112. The lamination stacks 114, 124, 126 may have interior curved surfaces 120 bearing equivalent radii or the radii may differ between lamination stacks 114, 124, 126. One or more of the lamination stacks 114, 124, 126 may have an interior curved surface 120 with a radius materially greater than the radius of the periphery of rotation 118 of the rotor 112 while the remainder of lamination stacks 114, 124, 126 have interior curved surfaces 120 with a radius equivalent to the radius of the periphery of rotation 118 of the rotor 112. If more than one of the lamination stacks 114, 124, 126 have an interior curved surface 120 with a radius materially greater than the radius of the periphery of rotation 118 of the rotor 112, those lamination stacks 114, 124, 126 may also have varying radii of the interior curved surfaces 120 such the rotor 112 is biased to the base position in one degree of freedom more than in another degree of freedom and not at all in a remaining degree of freedom. Further, one stator coil could be de-energized while another stator coil is energized, thus biasing the rotor 112 to the base position along one degree of freedom but not in another. The available permutations of these relationships are all considered to be within the scope of the present invention.

Embodiments of the invention described herein include mention of inclusion and omission of stator coils. The presence of stator coils allows a current to urge the output shaft 113 in a direction substantially perpendicular to a longitudinal axis of wires of one of the stator coils. Omission of the stator coils requires an outside force to urge the output shaft 113 out of the base position. Stator coils may be provided to urge the output shaft 113 in up to three degrees of freedom. Lamination stacks 114, 124, 126 may be provided with interior curved surfaces 120 to bias the output shaft 113 into a base position along up to three degrees of freedom. As disclosed herein, the output shaft 113 may be provided with a stator coil to urge the output shaft along only one degree of freedom, but have lamination stacks 114, 124, 126 that return the output shaft 113 to a base position along three degrees of freedom. Other useful permutations of biasing lamination stacks and stator coils may be understood by one of ordinary skill in the art based upon the teachings provided herein.

Figure 4:
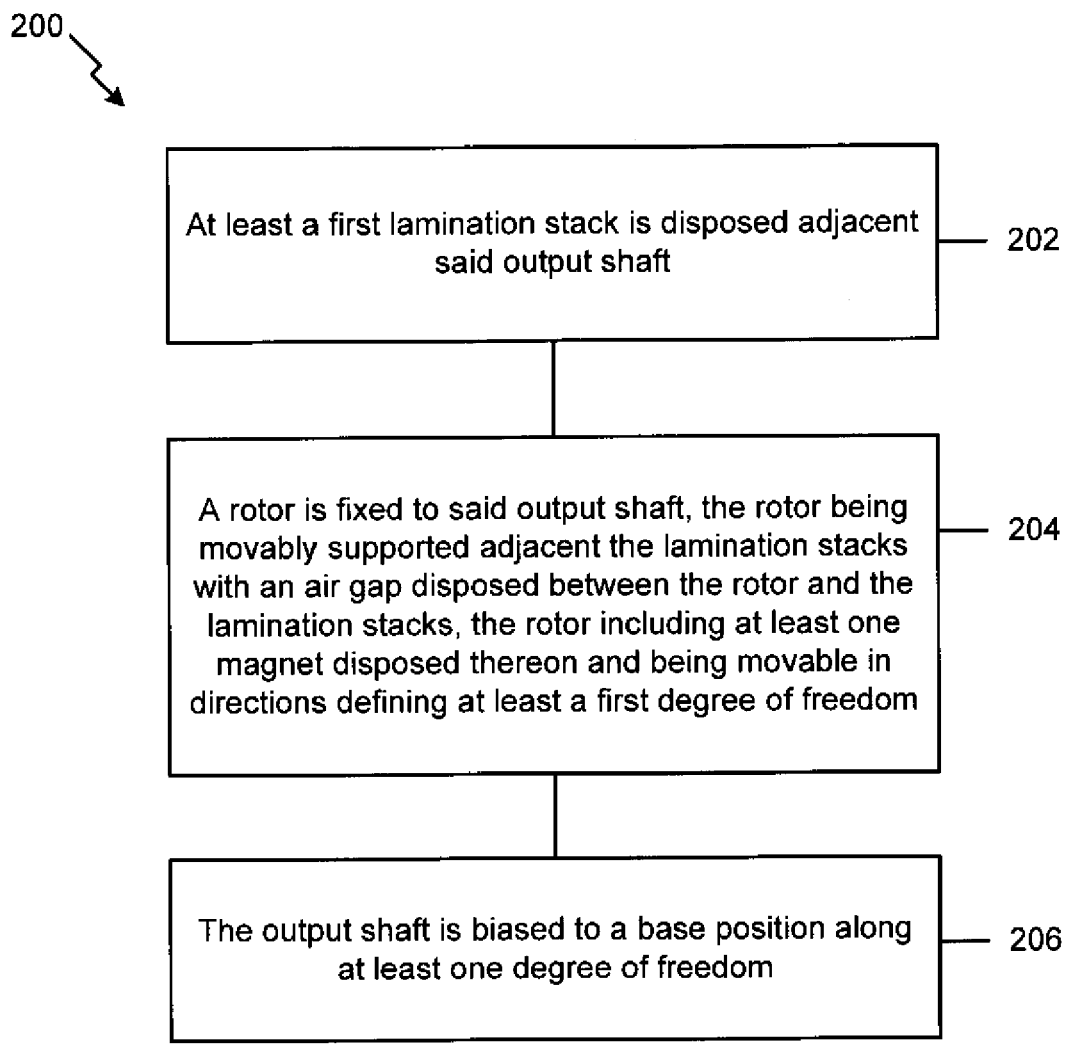
FIG. 4 is a flowchart illustrating a method of providing the motor assembly of FIG. 1, in accordance with the first exemplary embodiment of the invention.

FIG. 4 is a flowchart 200 illustrating a method of providing the motor assembly 10 of FIG. 1, in accordance with the first exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, at least a first lamination stack 14 is disposed adjacent said output shaft 13. A rotor 12 is fixed to said output shaft 13, the rotor 12 being movably supported adjacent the lamination stacks 14 with an air gap 16 disposed between the rotor 12 and the lamination stacks 14, the rotor 12 including at least one magnet 17 disposed thereon and being movable in directions defining at least a first degree of freedom (block 204). The output shaft 13 is biased to a base position along at least one degree of freedom (block 206).

It should be emphasized that the above-described embodiments of the present invention, particularly, any "preferred" embodiments, are merely possible examples of implementations, basically setting forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A motor comprising:
   an output shaft;
   a stator comprising at least a first lamination stack, each said lamination stack having an interior curved surface, said lamination stacks being disposed adjacent said output shaft; and
   a rotor fixed to said output shaft and movably supported adjacent said stator with an air gap disposed between said rotor and said stator, said rotor including at least one magnet disposed thereon and being movable along said interior curved surface of said lamination stacks in directions defining at least a first degree of freedom;
   wherein a radius of a periphery rotation of the rotor is less than a radius of the interior curved surface of said lamination stack, whereby the rotor is biased toward a base position along at least one degree of freedom.

2. The motor of claim 1, further comprising a stator coil mounted along the first lamination stack, wherein the rotor is biased toward the base position when the stator coil is de-energized.

3. The motor of claim 1, further comprising a stator coil mounted along the first lamination stack, wherein energization of the stator coil of said first lamination stack establishes a first magnetic field to urge said output shaft to rotate in a first plane.

4. The motor of claim 3, further comprising a stator coil mounted along the first lamination stack, wherein said first degree of freedom is substantially perpendicular to a longitudinal axis of wires of one of said stator coils associated with the first degree of freedom.

5. The motor of claim 1, wherein said curved interior surface is uniformly curved.

6. The motor of claim 1, wherein said air gap disposed between said rotor and said interior curved surface is variant along said interior curved surface.

7. The motor of claim 1, further comprising: a plurality of slots formed in said interior curved surface, wherein said slots lie in planes substantially parallel to one another; and a stator coil mounted in the slots.

8. The motor of claim 1, wherein at least one of said lamination stacks has a smooth interior curved surface with no slots formed therein.

9. The motor of claim 1, wherein said stator further comprises a second and third lamination stack, each lamination stack having a separate interior curved surface; and wherein said rotor is movable along said interior curved surface of said second and third lamination stack in a direction defining a second and third degree of freedom.

10. The motor of claim 1, wherein the radius of said interior curved surface of said lamination stack is at least twice the radius of the periphery of rotation of the rotor.

11. A device comprising:
   at least a first stator coil mounted within a first lamination stack;
   a rotor movably supported adjacent said stator coils with an air gap disposed between said rotor and said stator coils, said rotor including at least one magnet disposed thereon and being movable in directions defining at least a first degree of freedom;
   wherein energization of the first stator coil establishes a first magnetic field to urge said rotor to rotate in a first plane; and
   wherein a radius of a periphery rotation of the rotor is less than a radius of said stator coils, whereby the rotor is biased toward a base position.

12. The device of claim 11, wherein said stator further comprises a second and third stator coil; wherein said at least one magnet is movable in directions defining a second and third degree of freedom, wherein energization of the second stator coil establishes a second magnetic field to urge said rotor to rotate in a second plane substantially orthogonal to said first plane; and wherein energization of the third stator coil establishes a third magnetic field to urge said rotor to rotate in a third plane substantially orthogonal to each of said first and second planes.

13. The device of claim 11, wherein the rotor is biased toward the base position when the stator coil is de-energized.

14. The device of claim 11, wherein the air gap disposed between said rotor and said stator coils is variant in width dependent upon an orientation of the rotor.

15. A method of moving an output shaft in multiple degrees of freedom, said method comprising:
   disposing at least a first lamination stack adjacent said output shaft; fixing a rotor to said output shaft, said rotor being movably supported adjacent said lamination stacks with an air gap disposed between said rotor and said lamination stacks, said rotor including at least one magnet disposed thereon and being movable in directions defining at least a first degree of freedom; and
   biasing the output shaft to a base position along at least one degree of freedom, wherein a radius of a periphery rotation of the rotor is less than a radius of said lamination stack.

16. The method of claim 15, further comprising the step of returning the output shaft to the base position by de-energizing at least one stator coil.

17. The method of claim 15, further comprising varying a width of the air gap along an interior curved surface of the lamination stacks.

18. The method of claim 15, further comprising: disposing a second and third lamination stack adjacent said output shaft; fixing said rotor so as to be movable in directions defining a second and a third degree of freedom; and biasing the output shaft to the base position along at least two of the degrees of freedom.

19. The method of claim 18, wherein a biasing magnitude for each of the biased degrees of freedom is different.

* * * * *